(12) United States Patent
Bassin et al.

(10) Patent No.: US 8,566,805 B2
(45) Date of Patent: Oct. 22, 2013

(54) SYSTEM AND METHOD TO PROVIDE CONTINUOUS CALIBRATION ESTIMATION AND IMPROVEMENT OPTIONS ACROSS A SOFTWARE INTEGRATION LIFE CYCLE

(75) Inventors: Kathryn A. Bassin, Endicott, NY (US); Steven Kagan, Oakbrook Terrace, IL (US); Shao C. Li, Beijing (CN); Zhong J. Li, Beijing (CN); He H. Liu, Beijing (CN); Susan E. Skrabanek, Atlanta, GA (US); Hua F. Tan, Beijing (CN); Jun Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 965 days.

(21) Appl. No.: 12/557,816

(22) Filed: Sep. 11, 2009

(65) Prior Publication Data

US 2011/0066887 A1    Mar. 17, 2011

(51) Int. Cl.
*G06F 9/44* (2006.01)

(52) U.S. Cl.
USPC .......................................... 717/135; 717/132

(58) Field of Classification Search
USPC .................................................. 717/124–135
See application file for complete search history.

(56) References Cited

U.S. PATENT DOCUMENTS

| | | |
|---|---|---|
| 5,539,652 A | 7/1996 | Tegethoff |
| 5,905,856 A | 5/1999 | Ottensooser |
| 6,332,211 B1 | 12/2001 | Pavela |
| 6,442,748 B1 | 8/2002 | Bowman-Amuah |
| 6,456,506 B1 | 9/2002 | Lin |
| 6,477,471 B1 | 11/2002 | Hedstrom et al. |
| 6,519,763 B1 | 2/2003 | Kaufer et al. |
| 6,546,506 B1 | 4/2003 | Lewis |
| 6,601,233 B1 | 7/2003 | Underwood |
| 6,725,399 B1 | 4/2004 | Bowman |
| 6,889,167 B2 | 5/2005 | Curry |
| 6,901,535 B2 | 5/2005 | Yamauchi et al. |
| 6,988,055 B1 | 1/2006 | Rhea et al. |
| 7,200,775 B1 | 4/2007 | Rhea et al. |
| 7,231,549 B1 | 6/2007 | Rhea et al. |
| 7,334,166 B1 | 2/2008 | Rhea et al. |
| 7,451,009 B2 | 11/2008 | Grubb et al. |
| 7,630,914 B2 | 12/2009 | Veeningen et al. |
| 7,788,647 B2 | 8/2010 | Martin et al. |
| 7,809,520 B2 | 10/2010 | Adachi |
| 7,861,226 B1 | 12/2010 | Episkopos et al. |
| 7,886,272 B1 | 2/2011 | Episkopos et al. |

(Continued)

OTHER PUBLICATIONS

Holden et al. "Improving Testing Efficiency using Cumulative Test Analysis", 2006, IEEE, 5 pages.*

(Continued)

*Primary Examiner* — Ted T Vo
(74) *Attorney, Agent, or Firm* — Matthew Chung; Roberts Mlotkowski Safran & Cole, P.C.

(57) ABSTRACT

A method and system of calibrating estimates for software projects is provided. More particularly, a method and system is provided to continuously provide calibration estimation and improvement options across a software integration life cycle. The method is implemented in a computer infrastructure having computer executable code tangibly embodied on a computer readable storage medium having programming instructions operable to: compare actual data associated with a phase of a project to expected results used to develop a strategic development plan for the project; and calibrate efforts in the strategic development plan for future activities of the project based on the actual data.

23 Claims, 8 Drawing Sheets

(56) References Cited

U.S. PATENT DOCUMENTS

| | | | |
|---|---|---|---|
| 7,917,897 | B2 | 3/2011 | Bassin et al. |
| 7,984,304 | B1 | 7/2011 | Waldspurger et al. |
| 8,191,044 | B1 | 5/2012 | Berlik et al. |
| 2001/0052108 | A1 | 12/2001 | Bowman-Amuah |
| 2002/0078401 | A1 | 6/2002 | Fry |
| 2002/0188414 | A1 | 12/2002 | Nulman |
| 2003/0018952 | A1 | 1/2003 | Roetzheim |
| 2003/0033191 | A1 | 2/2003 | Davies et al. |
| 2003/0058277 | A1 | 3/2003 | Bowman-Amuah |
| 2003/0070157 | A1 | 4/2003 | Adams et al. |
| 2003/0196190 | A1 | 10/2003 | Ruffolo et al. |
| 2004/0205727 | A1 | 10/2004 | Sit et al. |
| 2004/0267814 | A1 | 12/2004 | Ludwig et al. |
| 2005/0071807 | A1 | 3/2005 | Yanavi |
| 2005/0102654 | A1 | 5/2005 | Henderson et al. |
| 2005/0114828 | A1 | 5/2005 | Dietrich et al. |
| 2005/0144529 | A1 | 6/2005 | Gotz et al. |
| 2005/0209866 | A1 | 9/2005 | Veeningen et al. |
| 2005/0283751 | A1 | 12/2005 | Bassin et al. |
| 2006/0047617 | A1 | 3/2006 | Bacioiu et al. |
| 2006/0248504 | A1 | 11/2006 | Hughes |
| 2006/0251073 | A1 | 11/2006 | Lepel et al. |
| 2006/0265188 | A1 | 11/2006 | French et al. |
| 2007/0100712 | A1 | 5/2007 | Kilpatrick et al. |
| 2007/0112879 | A1 | 5/2007 | Sengupta |
| 2007/0174023 | A1 | 7/2007 | Bassin et al. |
| 2007/0234294 | A1 | 10/2007 | Gooding |
| 2007/0283325 | A1 | 12/2007 | Kumar |
| 2007/0283417 | A1 | 12/2007 | Smolen et al. |
| 2007/0300204 | A1 | 12/2007 | Andreev et al. |
| 2008/0010543 | A1 | 1/2008 | Yamamoto et al. |
| 2008/0052707 | A1 | 2/2008 | Wassel et al. |
| 2008/0072328 | A1 | 3/2008 | Walia et al. |
| 2008/0092108 | A1 | 4/2008 | Corral |
| 2008/0092120 | A1 | 4/2008 | Udupa et al. |
| 2008/0104096 | A1 | 5/2008 | Doval et al. |
| 2008/0162995 | A1 | 7/2008 | Browne et al. |
| 2008/0178145 | A1 | 7/2008 | Lindley |
| 2008/0201611 | A1 | 8/2008 | Bassin et al. |
| 2008/0201612 | A1 | 8/2008 | Bassin et al. |
| 2008/0255693 | A1 | 10/2008 | Chaar et al. |
| 2009/0070734 | A1 | 3/2009 | Dixon et al. |
| 2010/0005444 | A1 | 1/2010 | McPeak |
| 2010/0145929 | A1 | 6/2010 | Burger et al. |
| 2010/0211957 | A1 | 8/2010 | Lotlikar et al. |
| 2010/0275263 | A1 | 10/2010 | Bennett et al. |
| 2010/0332274 | A1 | 12/2010 | Cox et al. |
| 2011/0296371 | A1 | 12/2011 | Marella |
| 2012/0017195 | A1 | 1/2012 | Kaulgud et al. |
| 2012/0053986 | A1 | 3/2012 | Cardno et al. |

OTHER PUBLICATIONS

Ian Holden, "Improving Testing Efficiency using Cumulative Test Analysis", 2006, 25 slides, retrieved from http://www2006.taicpart. org/presentations/session5/3.pdf, pp. 1-25.*
Ponaraseri et al., "Using the Planning Game for Test Case Prioritization", 2008, Retrieved from http://selab.fbk.eu/tonella/papers/issre2008.pdf, 10 pages.*
Paolo Tonella, "Publication List", 2012, Retrieved from http://selab. fbk.eu/, 15 pages.*
Office Action dated Nov. 5, 2012 in U.S. Appl. No. 12/558,274, 12 pages.
Office Action dated Nov. 8, 2012 in U.S. Appl. No. 12/558,260, 17 pages.
Office Action dated Dec. 20, 2012 in U.S. Appl. No. 12/558,147, 18 pages.
Office Action dated Nov. 8, 2012 in U.S. Appl. No. 13/595,148, 14 pages.
McGarry, J. et al., "Practical Software Measurement: A Guide to Objective Program Insight", http://pdf.aminer.org/000/361/576/practical_software_measurement.pdf, Naval Undersea Warfare Center, Version 2.1, Part 1 to Part 4, 1996, 299 pages.
Jonsson, G., "A Case Study into the Effects of Software Process Improvement on Product Quality", Jun. 2004, Master's Tesis in Computer Science—University of Iceland, 93 pages.
Office Action dated Oct. 11, 2012 in U.S. Appl. No. 12/558,327, 12 pages.
Notice of Allowance dated Aug. 31, 2012 in U.S. Appl. No. 12/558,375, 16 pages.
Hurlbut, "Managing Domain Architecture Evolution Through Adaptive Use Case and Business Rule Models", 1997, pp. 1-42.
Final Office Action dated Nov. 23, 2012 in U.S. Appl. No. 12/557,886, 42 pages.
Boehm, B., "Software Engineering Economics", IEEE Transactions on Software Engineering, vol. SE-19, No. 1, Jan. 1984, pp. 4-21.
Basili, V. et al., "Comparing the Effectiveness of Software Testing Strategies", IEEE Transactions on Software Engineering, vol. SE-13, No. 12, Dec. 1987, pp. 1278-1296.
Office Action dated Jun. 14, 2012 in U.S. Appl. No. 12/557,886, 38 pages.
Ambler, S., "Choosing the Right Software Method for the Job", http://web.archive.org/web/20090219074845/http://agiledata.org/essays/differentStrategies.html, retrieved Jun. 7, 2012, pp. 1-14.
Unknown, "ASTQB—ISTQB Software Testing Certification : ISTQB Syllabi", http://web.archive.orb/web/20090423053623/http://www.astqb.org/educational-resources/syllabi-management5.php, retrieved Jun. 7, 2012, pp. 1-12.
Office Action dated Oct. 3, 2012 in U.S. Appl. No. 12/558,382, 11 pages.
Office Action dated Dec. 7, 2012 in U.S. Appl. No. 12/558,324, 15 pages.
Office Action dated Apr. 13, 2012 in U.S. Appl. No. 12/558,324, 10 pages.
Office Action dated Apr. 27, 2012 in U.S. Appl. No. 12/558,375, 10 pages.
Office Action dated Nov. 23, 2012 in U.S. Appl. No. 12/558,263, 36 pages.
Kwinkelenberg, R. et al., "Smartesting for Dummies", Oct. 14, 2008, Wiley, 36 pages.
Lazic, L. et al., "Cost Effective Software Test Metrics", WSEAS Transactions on Computers, Issue 6, vol. 7, Jun. 2008, pp. 559-619.
Hou, R. et al., Optimal Release Times for Software Systems with Scheduled Delivery Time Based on the HGDM, IEEE Transactions on Computers, vol. 46, No. 2, Feb. 1997, pp. 216-221.
Notice of Allowance dated Apr. 15, 2013 in related U.S. Appl. No. 12/558,274, 20 pages.
Final Office Action dated Apr. 3, 2013 in related U.S. Appl. No. 12/558,327, 11 pages.
Final Office Action dated May 13, 2013 in related U.S. Appl. No. 12/558,382, 12 pages.
Notice of Allowance dated Apr. 24, 2013 in related U.S. Appl. No. 12/558,260, 9 pages.
Final Office Action dated Mar. 29, 2013 in related U.S. Appl. No. 12/558,263, 54 pages.
Ulrich, "Test Case Dependency Processing in Robot Framework", https://groups.google.com/forum/?fromgroups#!topic/robotframework-users/twcycBNLXI4, Google, Feb. 16, 2009, pp. 1-4.
Notice of Allowance dated Apr. 2, 2013 in related U.S Appl. No. 12/558,147, 10 pages.
Final Office Action dated Jun. 13, 2013 in related U.S. Appl. No. 13/595,148, 8 pages.
Chan et al., "A Tool to Support Perspective Based Approach to Software Code Inspection", Proceedings of the 2005 Australian Software Engineering Conference, IEEE, 2005, 8 pages.
Notice of Allowance dated Jun. 24, 2013 in related U.S. Appl. No. 12/558,327, 6 pages.
Final Office Action dated Jul. 31, 2013 in related U.S. Appl. No. 12/558,382, 13 pages.
Final Office Action dated Jul. 18, 2013 in related U.S. Appl. No. 12/558,324, 15 pages.

* cited by examiner

SYSTEM AND METHOD TO PROVIDE CONTINUOUS CALIBRATION ESTIMATION AND IMPROVEMENT OPTIONS ACROSS A SOFTWARE INTEGRATION LIFE CYCLE

CROSS REFERENCE TO RELATED APPLICATIONS

The present invention is related to copending application Ser. Nos. 12/558,327 and 12/558,274, the contents of which are incorporated herein by reference in their entireties.

FIELD OF THE INVENTION

The present invention generally relates to a method and system of calibrating estimates for software projects, and more particularly, to a method and system to provide continuous calibration estimation and improvement options across a software integration life cycle.

BACKGROUND

While software systems continue to grow in size and complexity, business demands continue to require shorter development cycles. This has led software developers to compromise on functionality, time to market, and quality of software products, for example. Furthermore, the increased schedule pressures and limited availability of resources and skilled labor can lead to problems such as inefficient testing, high development and maintenance costs, and the like. This may lead to poor customer satisfaction and a loss of market share for software developers.

To improve product quality many organizations devote an increasing share of their resources to testing and identifying problem areas related to software and the process of software development. Accordingly, it is not unusual to include a quality assurance team in software development projects to identify defects in the software product during and after development of a software product. By identifying and resolving defects before marketing the product to customers, software developers can assure customers of the reliability of their products, and reduce the occurrence of post-sale software fixes such as patches and upgrades which may frustrate their customers.

Testing and identifying problem areas related to software development may occur at different points or stages in a software development lifecycle. For example, a general software development lifecycle includes a high level requirements/design review, a detailed requirements/design review, code inspection, unit test, system test, system integration test, performance test and user acceptance test. However, as the software development lifecycle proceeds from high level requirements/design review to user acceptance test, costs for detecting and remedying software defects generally increases, e.g., exponentially. As such, software developers seek to detect and remedy software defects as early in the software development lifecycle in an effort to avoid the increased costs of detecting and remedying these software defects later in the software development lifecycle.

Complex system integration development is very expensive and considered high risk, as the majority of defects are found later in the life cycle due to the methodologies used to test projects. For example, test projects are planned inefficiently/ineffectively because there is no solution that provides real time insight necessary to find and fix defects as early as possible. For this reason, consistently accurate defect projection modeling in complex system integration testing is considered impossible absent significant project history. That is, conventionally, historical defect data for a project (e.g., a software code project) must be available in order to accurately project future defect patterns and trends for the project. This historic defect data may aid an organization in detecting software defects, in order to project future defect patterns and trends for the project.

It is known, though, that at the earliest stages of the software development lifecycle (when defects are less costly to identify and remedy), historical defect data for the project may not yet be available. That is, at the earliest stages of the software development lifecycle, no testing has yet occurred to provide the necessary historical defect data for the project. Thus, although most complex system integration project owners would like to accurately project defect rates to effectively plan release development, test, and launch activities and costs, this is often not possible since there is little or no applicable project history available, e.g., earlier in the design project.

Also, differences between historic project information and a current project frequently mean the projections using historical data will not be very accurate when compared against the actual current project results. Furthermore, the approach of using historical projects for estimation provides no guidance or useful insight into how to best adjust strategic development plans while the project is underway to reflect changed conditions. As a result, detailed estimation planning is rarely performed on many of the large and complex efforts that would most benefit from such planning. And, even when estimation planning is used, such planning remains static throughout the project, even though defects in rates other than those planned for may have been discovered during each phase of the project, and each deviation from defect expectations directly effects the defect expectations in each subsequent phase of the project, including production.

Accordingly, there exists a need in the art to overcome the deficiencies and limitations described hereinabove.

SUMMARY

In a first aspect of the invention, a method is implemented in a computer infrastructure having computer executable code tangibly embodied on a computer readable storage medium having programming instructions. The programming instructions are operable: compare actual data associated with a phase of a project to expected results used to develop a strategic development plan for the project; and calibrate efforts in the strategic development plan for future activities of the project based on the actual data.

In another aspect of the invention, a system comprises a calibration tool operable to calibrate a strategic development plan originally based on expected results obtained from a user or expert system. The calibration tool calibrates efforts noted in the strategic development plan for future activities in a project using actual data obtained from a current phase of the project.

In an additional aspect of the invention, a computer program product comprising a computer usable storage medium having readable program code embodied in the medium is provided. The computer program product includes at least one component operable to: receive expected results to develop a strategic development plan for a software integration project; compare actual test data associated with a phase of the software integration project to the expected results; and dynamically calibrate efforts for future activities based on the actual data when the actual data does not match the expected test results.

In a further aspect of the invention, a computer system for calibrating efforts of a strategic plan, the system comprises a CPU, a computer readable memory and a computer readable storage media. Additionally, the system comprises: first program instructions to receive expected results to develop a strategic development plan for a software integration project; second program instructions to compare actual test data associated with a phase of the software integration project to the expected results; and third program instructions to dynamically calibrate efforts for future activities based on the actual data when the actual data does not match the expected test results. The first, second and third program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
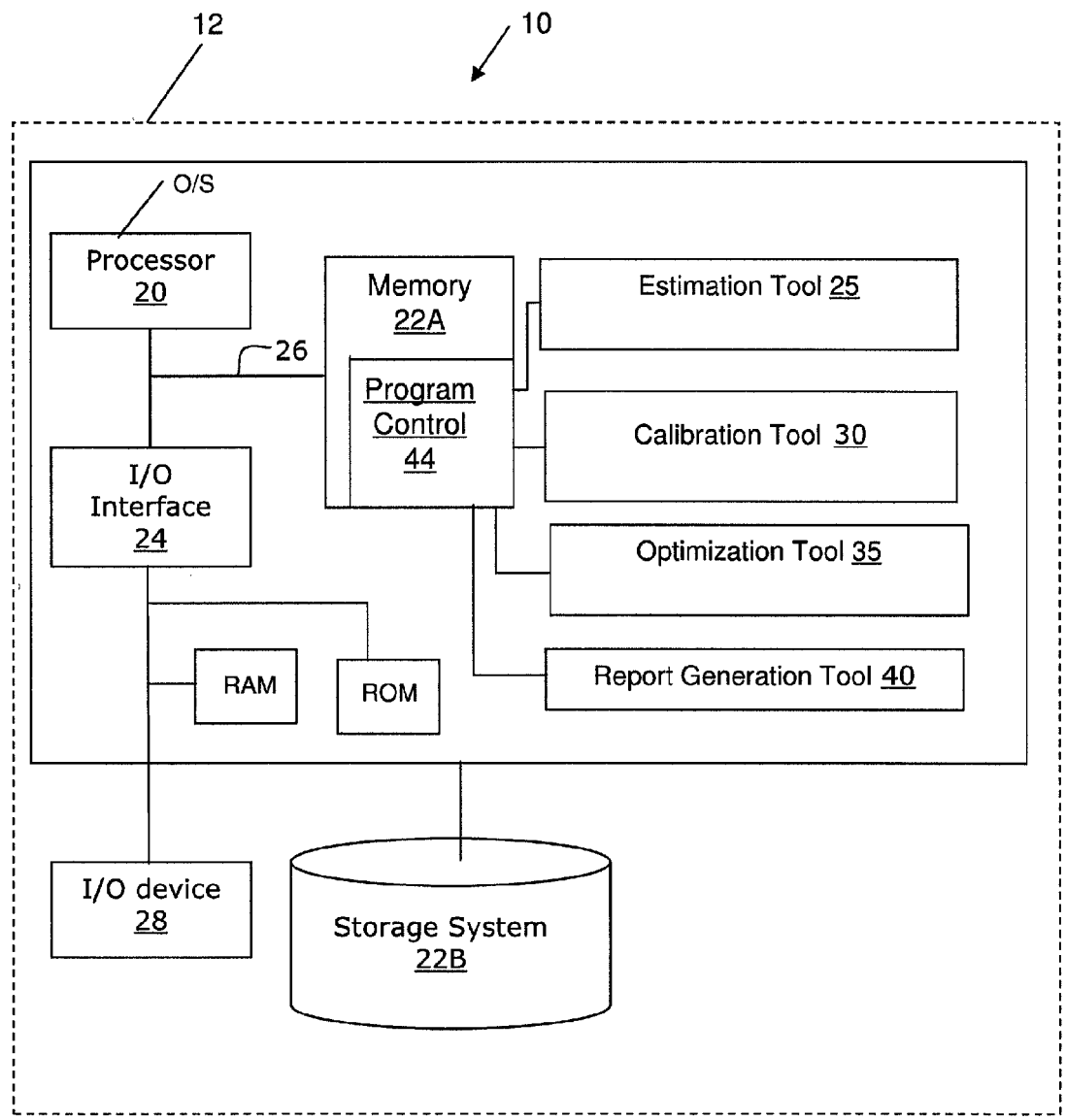
FIG. 1 shows an illustrative environment for implementing the steps in accordance with aspects of the invention.

The present invention generally relates to a method and system of calibrating estimates for software projects, and more particularly, to a method and system to provide continuous calibration estimation and improvement options across a software integration life cycle. In embodiments, the present invention provides a method and system to support ongoing, dynamic calibration of a strategic development plan for a complex integration project based on actual data received from a current phase of a project (prior to completion of the entire software integration project). More specifically, the calibration is based on actual data obtained from a test of a completed phase of a project. This information can then be used to adjust an original strategic development plan for future phases in the software integration project. For example, testing procedures, team make-up and other resources can be reallocated or calibrated based on the information gleaned from actual data of a completed phase of the project. This calibration, in turn, will be used to optimize future phases of the software integration project.

As an example, in embodiments, the present invention comprises performing an initial estimation of the entire software integration project based on some general information the user (or expert system) provides to the system of the present invention. The general information may include, for example, complexity of the project, personnel decisions, initial distributions, and other resource allocations, as well as the maturity of the organization. Maturity of the organization refers to the capabilities of an organization in performing complex integration projects. For example, a mature organization will have extensive experience and successful outcomes in organizing, performing and completing complex integration projects. Initial estimates may include, for example, expected projected defects based on an organization's maturity level, projected time schedules and personnel decisions, as well as the allocation of other resources, based on each phase of a project.

Once a particular phase of the project is completed, the actual data obtained from testing such phase is acquired and, using this information, the system and method (e.g., model) updates the overall estimate/projection (originally developed plan for the project). If the actual result based on the estimation does not meet expectations, e.g., cost estimates, resource allocation, time schedules, etc., the model will provide suggestions on how the strategic development plan can be adjusted to satisfy the expected quality goal, schedule goal, etc. This can be repeated until the project is completed such that ongoing calibration and improvement options can be provided to the user, e.g., software developer.

Illustratively, upon completion of a "system test" phase, the actual data of the "system test" phase is captured. A calibration tool of the present invention will then use this information to adjust the future phases of the project based on the current actual data, whereas an optimization tool of the present invention will adjust the original plan to achieve the desired quality goal, schedule goal, etc. As a result, the strategic development plan for subsequent activities after "system test" is adjusted so that it now better reflects what will realistically occur on the project. Advantageously, having this information in real time provides essential insight to project stakeholders so that they can make meaningful and practical adjustments as needed while the project is still underway. Without such insight, projects are left to wait until the project has completed, at which time it would be possible to derive various "lessons learned" that can only then be applied to future projects, resulting in a far slower quality improvement cycle.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires,
a portable computer diskette, a hard disk,
a random access memory (RAM),
a read-only memory (ROM),
an erasable programmable read-only memory (EPROM or Flash memory),
an optical fiber,
a portable compact disc read-only memory (CDROM),
an optical storage device,
a transmission media such as those supporting the Internet or an intranet, or
a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1). In embodiments, the environment 10 may be designated as a calibration and optimization workbench.

The computing device 14 includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. The bus 26 provides a communications link between each of the components in the computing device 14. In addition, the computing device includes random access memory (RAM), a read-only memory (ROM), and an operating system (O/S). In general, the processor 20 executes computer program code (e.g., program control 44), which can be stored in the memory 22A and/or storage system 22B. While executing the computer program code, the processor 20 can read and/or write data to/from memory 22A, storage system 22B, and/or I/O interface 24.

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, a handheld device, PDA, handset, keyboard, etc.

The computing device 14 further includes an estimation tool 25, a calibration tool 30, optimization tool 35, and report generation tool 40. The estimation tool 25, calibration tool 30, optimization tool 35, and report generation tool 40 can be implemented as one or more program code in the program control 44 stored in the memory 22A as separate or combined modules. The program control 44 controls and/or executes the processes of the invention. In embodiments, calibration, estimation and optimization profiles may be stored in the storage system 22B, which may be, for example, a database. For example, rules used to determine calibration and optimization results, as discussed further below, may be stored in the storage system 22B.

In embodiments, the estimation tool 25 estimates the test effect according to the test plan (test effort and the test effort distribution), test organization and the system under testing, where the test plan and test effect has data for each project phase. The estimation tool 25, in embodiments, can also estimate the effects of a calibration and/or optimization performed by the calibration tool 30 and/or optimization tool 35. This can be performed by computer simulations discussed below. In this way, if the calibration and/or optimization do not meet the stated goals/objectives of the developer, the strategic development plan will not be updated and further iterations to the strategic development plan can be performed by the calibration tool 30 and/or optimization tool 35.

The calibration tool 30 is operable to calibrate the strategic development plan (that was originally developed from, for example, the estimated data generated from the estimation tool) using actual data obtained from a current phase of a project (e.g., obtained from a test). For example, using actual data obtained from a test in a software integration project, the calibration tool 30 will adjust the efforts (e.g., resources, time schedules, etc.) for future activities within the software integration project, e.g., adjust the estimated effort (add or reduce effort) for each trigger in each activity. That is, the calibration tool 30 can, for example, provide a percentage change to the estimated effort needed for a particular phase in the project in order to show the developer how to best adjust resources for future activities in the integration project (e.g., add or reduce effort for particular stages in a project). In embodiments, a "trigger" indicates where (and possibly, how) a defect was discovered (e.g., the circumstances surrounding the defect discovery), which is further defined in application Ser. No. 12/558,274.

The optimization tool 30 is operable to adjust the original strategic development plan to achieve a desired quality goal, schedule goal, etc. based on the calibration results. As a result, the original strategic development plan for subsequent activities can be adjusted to better reflect what will realistically occur on the project based on past performance data of the complex integration project. The calibration, optimization and estimation can be shown graphically or otherwise using the report generation tool 40. The report generation tool 40 can also be used to show any of the interfaces described herein.

In one example, testing procedures, team make-up and other resources can be reallocated or calibrated based on the information obtained from actual data gleaned from a completed phase of the project. Thus, advantageously, the method and system of the present invention leverages the actual data as the project is progressing, and is operable to translate that information into precise and meaningful adjustments to the original strategic development plan, in real time. This approach provides significantly greater control and ability to proactively manage risk than the alternative approach of relying on historic project information alone.

The computing device 14 can also comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Exemplary Flow Diagrams, User Interfaces and Related Functionality of Tools

FIGS. 2-4 and 7 illustrate a high level flow in accordance with aspects of the invention. The steps of FIGS. 2-4 and 7 may be implemented in the environment of FIG. 1, for example. The flow diagrams may equally represent a high-level block diagram or a swim-lane diagram of the invention. The flowchart and/or block diagrams in FIGS. 2-4 and 7 illustrate the architecture, functionality, and operation of possible implementations of systems, methods and computer program products according to various embodiments of the present invention. In this regard, each block in the flowchart, block diagram or swim-lane diagram may represent a module, segment, or portion of code, which comprises one or more executable instructions for implementing the specified logical function(s). It should also be noted that, in some alternative implementations, the functions noted in the blocks may occur out of the order noted in the figure. For example, two blocks shown in succession may, in fact, be executed substantially concurrently, or the blocks may sometimes be executed in the reverse order, depending upon the functionality involved. Each block of each flowchart and combinations of the flowchart illustration can be implemented by special purpose hardware-based systems that perform the specified functions or acts, or combinations of special purpose hardware and computer instructions and/or software, as described above. Moreover, the steps of the flow diagram may be implemented and executed from either a server, in a client server relationship, or they may run on a user workstation with operative information conveyed to the user workstation. In an embodiment, the software elements include firmware, resident software, microcode, etc.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Figure 2:
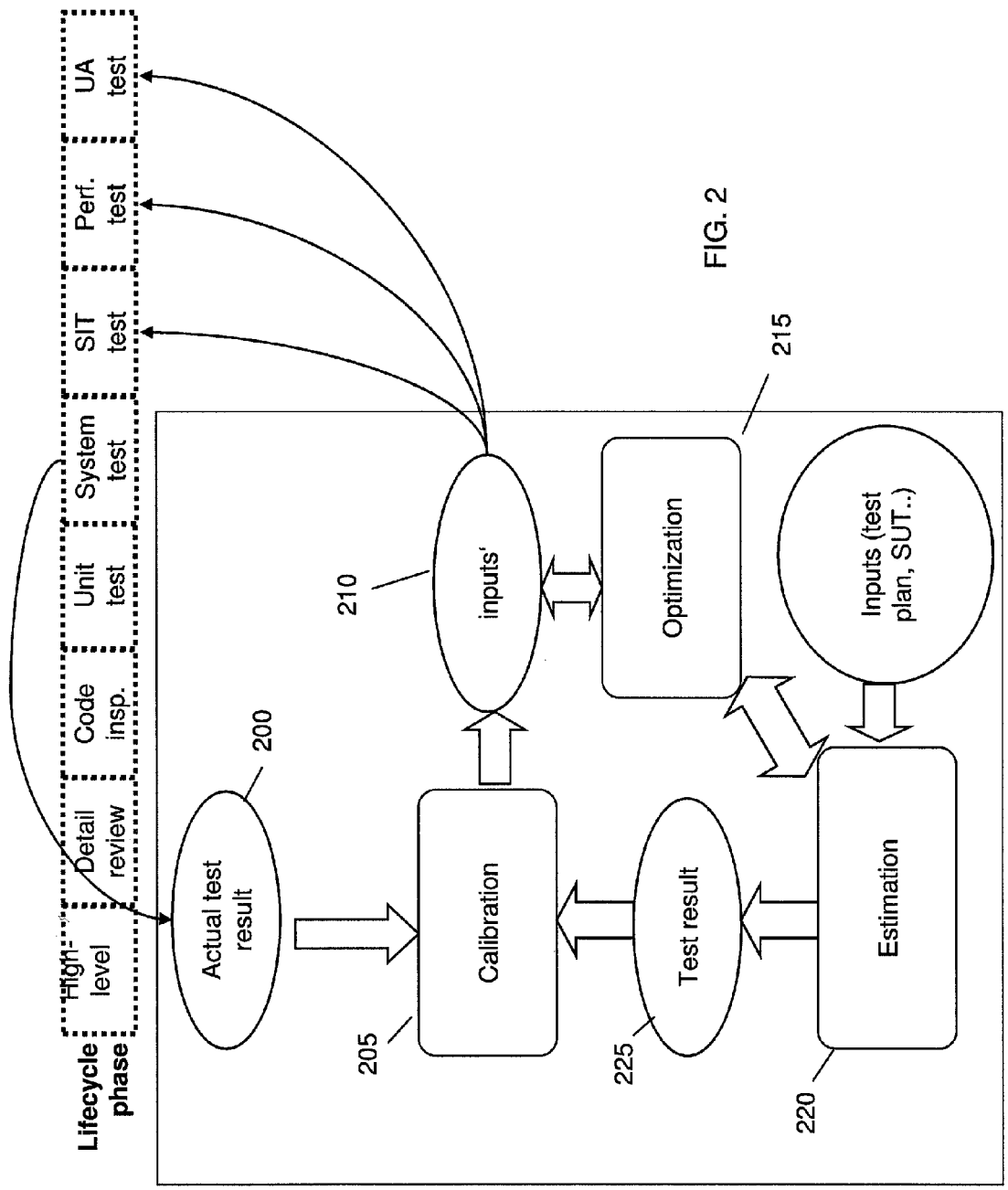
FIG. 2 shows an exemplary depiction of a high level flow diagram in accordance with aspects of the invention.

FIG. 2 shows a high level flow diagram implementing processes in accordance with the invention. As shown in FIG. 2, the present invention can use any of the life cycle phases of a software development project. For example, the present invention can use information obtained from at least one of: a high level development phase, a detail review phase, a code inspection phase, a unit test phase, a system test phase, SIT (System Integration Test) phase, a performance testing phase and a UA (User Acceptance) phase, all well known to those of skill in the art. In the particular example of FIG. 2, the system of the present invention is using information obtained from the system test phase, although one of skill in the art should understand that information obtained from any of the phases can be used with the present invention.

In particular, at step 200, actual test results of the system test phase are obtained and compared to expected results. The expected test results can be based on user input using information such as, for example, a maturity level of the organization, expected resources to be used at different phases, resource allocations, expected defects, etc. If the actual test results are not the same as the expected test results, at step 205, the calibration tool will calibrate/change the documentation, e.g., overall strategic development plan, in real time, to adjust the overall strategic development plan based on the actual test results. For example, at step 210, the calibration tool provides a new/update worksheet (strategic development plan), e.g., adding additional resources, code alterations, etc. for downstream phases of the project such as, for example, SIT testing, performance testing or UA testing. The outputs from the calibration tool can be obtained from the database 22B using, for example, the actual test results, maturity levels of the organization, etc. In this way, the calibration tool will renew the overall strategic development plan and documentation.

At step 215, the optimization tool will apply the calibration to future phases/activities in order to optimize the overall strategic development plan. For example, when a defect pattern develops, the optimization tool can suggest mitigating circumstances in order to compensate for such defect patterns, etc. In embodiments, the optimization tool can obtain such mitigating circumstances from the database (storage 22B), which can store different mitigating circumstances matched to known defect patterns, maturity levels of the organization and actual test results, as compared to the expected test results. That is, using a rules based engine, the optimization tool can produce suggested changes to the strategic development plan.

At step 220, the optimization results and inputs from, e.g., a strategic development plan, are provided to an estimation module. The estimation module, in embodiments, will estimate the results that can be obtained by using the mitigating circumstances from the optimization tool. This can be performed by, for example, running simulations using the different mitigating circumstances in order to estimate test results of a next phase of the project, e.g., SIT testing, at step 225. If the result based on the estimation does not meet expectations, e.g., cost estimates, schedules, etc., the model will provide additional calibrations and suggestions on how the strategic development plan can be adjusted to satisfy the expected quality goal, schedule goal, etc., at step 205 This can be repeated until the project is completed and/or results are accepted to the developer.

In this way, the actual test results provided to the calibration tool can be used to dynamically change (calibrate) the overall strategic development plan, in real time. If the changes are not acceptable to the developer(s), though, the calibration tool can provide different calibrations to provide further calibrations and/or optimization results until an acceptable calibration is provided. This can be performed prior to changing the strategic development plan via the use of the estimation tool. As shown in FIG. 2, the outputs obtained using the calibration tool can be provided to the developer in order to update the documentation/overall strategic development plan, for future testing, e.g., SIT, performance testing, UA testing, etc.

Figure 3:
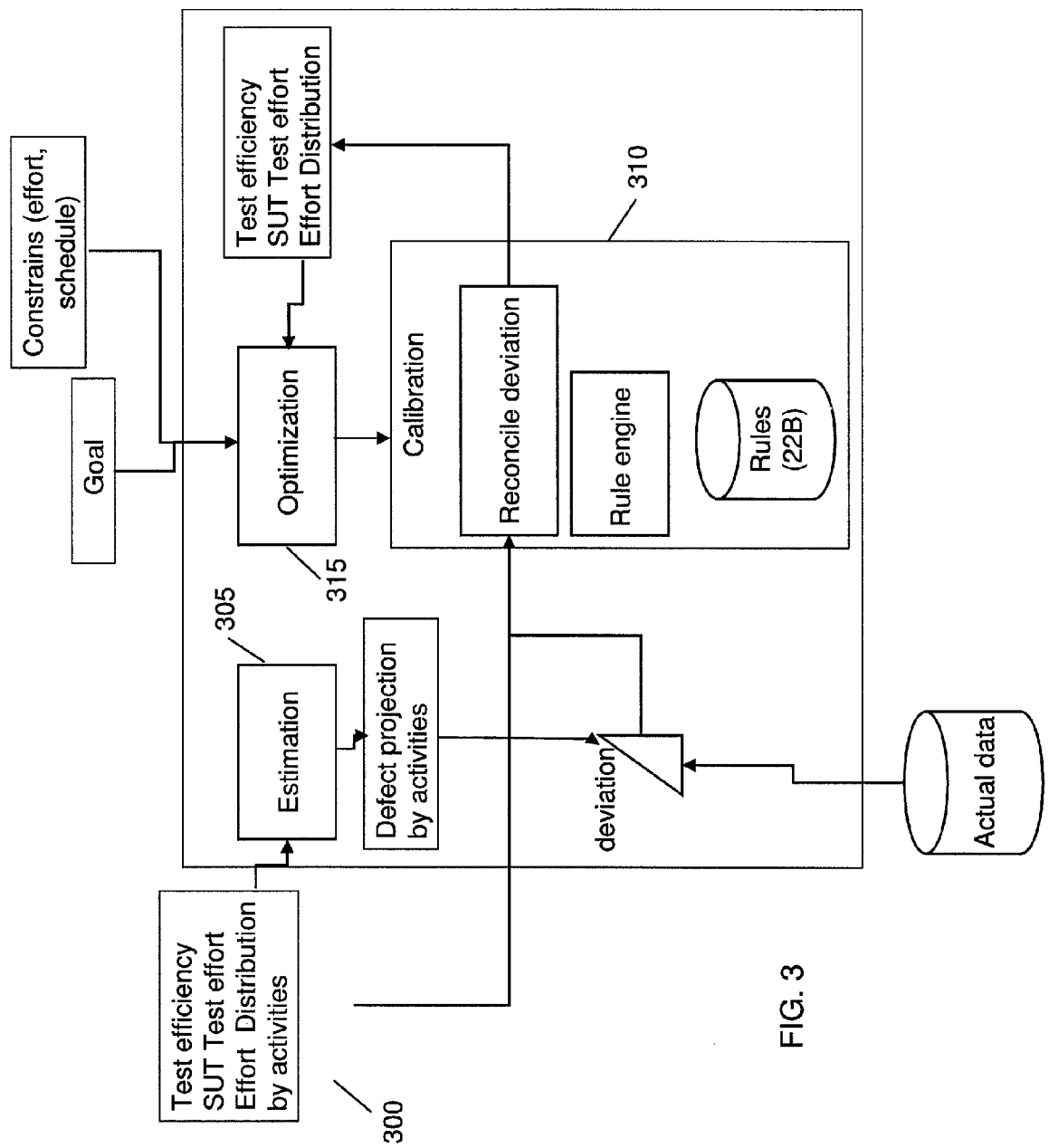
FIG. 3 shows an exemplary architecture and/or high level flow diagram in accordance with aspects of the invention.

FIG. 3 shows an exemplary flow diagram implementing the tools of FIG. 1. By way of illustration, differences between historic project and the current project frequently translate into the projections using historical project data not being very accurate when compared against the actual current project results. Furthermore, it has been found that using historical projects for estimation provides little to no guidance or useful insight into how to best adjust the strategic development plan while the project is underway to reflect changed conditions. As a result, detailed estimation planning and/or ongoing calibration is very useful when planning large and complex software integration efforts. As such, FIG. 3 outlines a unique model for (i) delivering accurate estimates and projections and (ii) performing ongoing calibration of those estimates and projections while the project is still underway (in real time). Specifically, the method of FIG. 3 shows the generation of estimate results by phases to dynamically calibrate the strategic development plan, and an optimization process to enable accurate and detailed estimation planning and ongoing calibration.

In particular, at step 300, the system of the present invention receives input from a developer. This information may include, for example, test efficiency, test effort, and effort distribution by activities, amongst other input. More specifically, TABLE 1 shows exemplary inputs and definitions of such inputs provided at step 300.

TABLE 1

| Input | Definition |
| --- | --- |
| SUT (System Under Test) | Specifies the characteristic of the current system under testing |
| Test Effort ("effort" = person day) | Specifies the total effort to be devoted to testing |
| Effort distribution | Defines how the total effort is allocated to each activity |
| Test Efficiency | Defines the relationship between devoted effort and the defects discovered |

This input can be provided to the calibration tool and estimation tool. At step 305, the estimation tool estimates the test effect according to the strategic development plan (e.g., test effort and the test effort distribution), test organization and the system under testing. For example, the estimation tool can create an estimation based on the maturity of the organization and/or other user inputs which can include the inputs provided at step 305. The strategic development plan and test effect has data for each project phase. After one activity is completed, the actual data is input to the system.

At step 310, the calibration tool compares the actual data and estimated (or expected) data together to perform a reconciliation of the strategic development plan with a defined set of rules. That is, the calibration tool reconciles the deviation between the actual data and defect projection by activities in order to update the strategic development plan of the project. The rules can be defined by users (or by an expert system), where each rule can be composed of three parts: symptom, cause and treatment. For example, TABLE 2 shows an exemplary rule set that shows a calibration (treatment) for different symptoms. The rule set of TABLE 2, as well as other rule sets contemplated by the present invention can be stored in the database 22B of FIG. 1.

TABLE 2

| Symptom | Cause | Treatment |
| --- | --- | --- |
| The actual effort is different from the expected effort | Estimated effort is not correct | Adjust the effort to the actual one. |
| The discovered defect number is larger than the expectation | Devoted effort, e.g. how much time actually spent, DDE (Defect Discovery Efficiency, e.g., average number of defects found per person per day, which defines how many | Select one set of the most suspicious inputs and adjust them in order to optimize the |

TABLE 2-continued

| Symptom | Cause | Treatment |
| --- | --- | --- |
| | average defects will be discovered by each Person Day, or PD) and/or the potential defect volume is larger | integration. |
| The discovered defect number is smaller than the expectation | Devoted effort, DDE and/or the potential defect volume is smaller | Select one set of the most suspicious inputs and adjust them in order to optimize the integration. |

After the calibration is performed, the adjusted inputs are recalculated to more accurately reflect the current situation based on the actual data. These calculated inputs may be, for example, test efficiency, SUT, test efforts, or effort distribution, amongst other inputs, each of which may have been changed based on the variables obtained by the actual results.

At step 315, the optimization tool can be leveraged to optimize the current strategic development plan according to the expected quality, schedule or other goal according to the results of the calibration tool and/or other inputs. The optimization tool can use the results of the calibration tool, in addition to goals set by the developer as well as other constraints such as, for example, scheduling, etc. to provide suggestions to the developer. The suggestions, as discussed herein, can be based on rules associated with causes and symptoms known to be associated with the actual test results. As shown in FIG. 3, if the results of the optimization tool are not acceptable, e.g., the results do not meet the expectations of the developer, the calibration tool can dynamically readjust the inputs until an optimal/expected strategic development plan is achieved by the present invention using the rules described herein.

Figure 4:
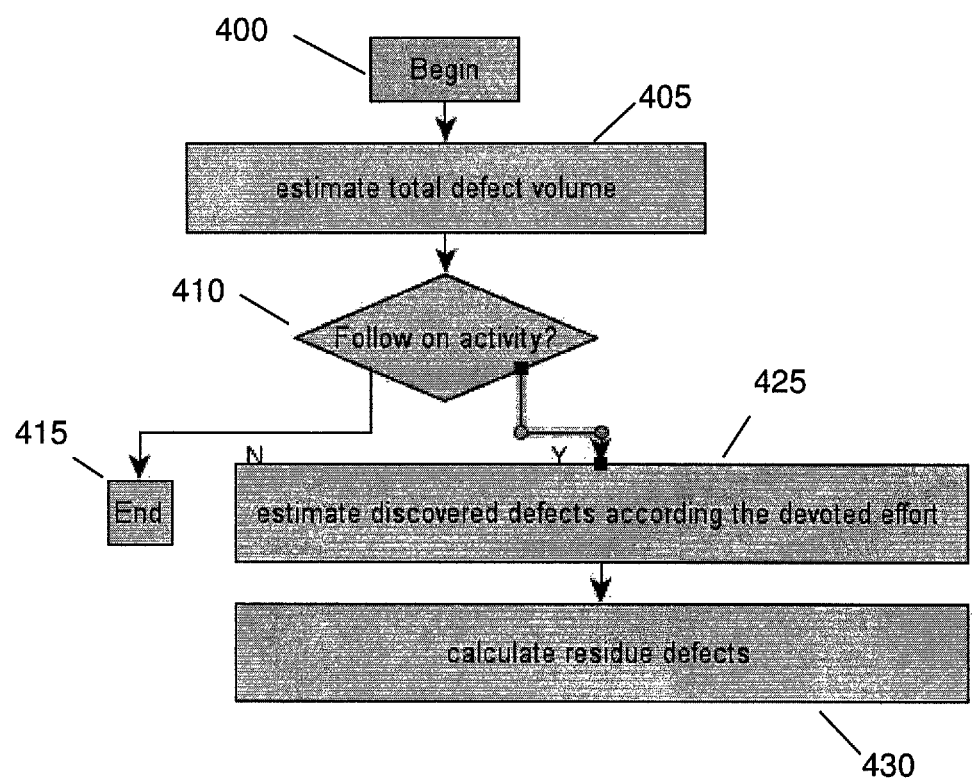
FIG. 4 shows an exemplary flow diagram in accordance with aspects of the invention.

FIG. 4 shows a flow diagram for estimating defects in accordance with the present invention. In general, the estimation tool estimates the potential total defect volume and then projects the discovered defects in each project activity according to the potential defect volume, the devoted effort, and the test efficiency, for example.

In particular, the process begins at step 400. At this stage, information can be entered into the system in order to estimate defects. The inputs can be, for example, the following inputs shown in TABLE 3.

TABLE 3

| Input | Definition |
| --- | --- |
| SUT (System Under Test) | Specifies the characteristic of the current system under testing |
| Test Effort ("effort" = person day) | Specifies the total effort to be devoted to testing |
| Effort distribution | Defines how the total effort is allocated to each activity |
| Test Efficiency | Defines the relationship between devoted effort and the defects discovered |

At step 405, the estimation tool estimates a total defect volume for a particular phase in the software integration project. That is, the estimation tool estimates the expected defects for a particular phase in the software integration project. These estimates may be, for example, best guess estimates based on the data provided, for example, in TABLE 3, as well as other data such as, for example, historical data. The estimation tool can also use an already existing project or a profile which characterizes the potential defect volume and distribution information as a reference.

In further embodiments, the outputs from the calibration tool and/or optimization tool can be provided to the estimation tool prior to the development of a new strategic development plan. In this way, the estimation tool can simulate different scenarios for the developer to determine whether the stated goals and/or objectives are met. If the simulations are acceptable, the strategic development plan can be updated by the system and method of the present invention. If the simulations are not acceptable, additional inputs can be fed into the calibration tool until an acceptable solution is found.

In embodiments, there are two factors that can be used to determine the defect volume. For example, the first factor is the defect density and the second factor is the project size. In embodiments, the defect density is determined by the reference project and the ratio between the characteristics of the current project and those of the reference project. The characteristics should have reasonable coverage of relevant factors which could affect the defect density. In further embodiments, the potential defect volume is equal to the accumulation of defect density multiplied by project size.

At step 410, the program control will determine whether additional follow on activities are required, i.e., cycle through the estimation process for each activity such as, for example, design reviews, code inspections, system tests, etc., depending on what activities are to be included in the analysis. Once the estimation has been performed for all of the activities, the process will then perform the calibration. More specifically, the program control will determine whether actual defects have been received from the activity in order to calculate or measure a defect deficiency in the calibration tool. If no activity is required, the process ends at step 415.

If additional activities are required, the process continues to step 420. At step 420, the discovered defects are estimated according to the devoted effort, e.g., resources allocated to the particular phase of the integration project. This estimate can be calculated, for example, on additional information provided to the developer such as, for example, alterations to the code, historical defects or other triggers (e.g., known defects). The residual defects may be the defects that end up in production of the integrated software project, and which will not significantly affect the end product.

Figure 5:
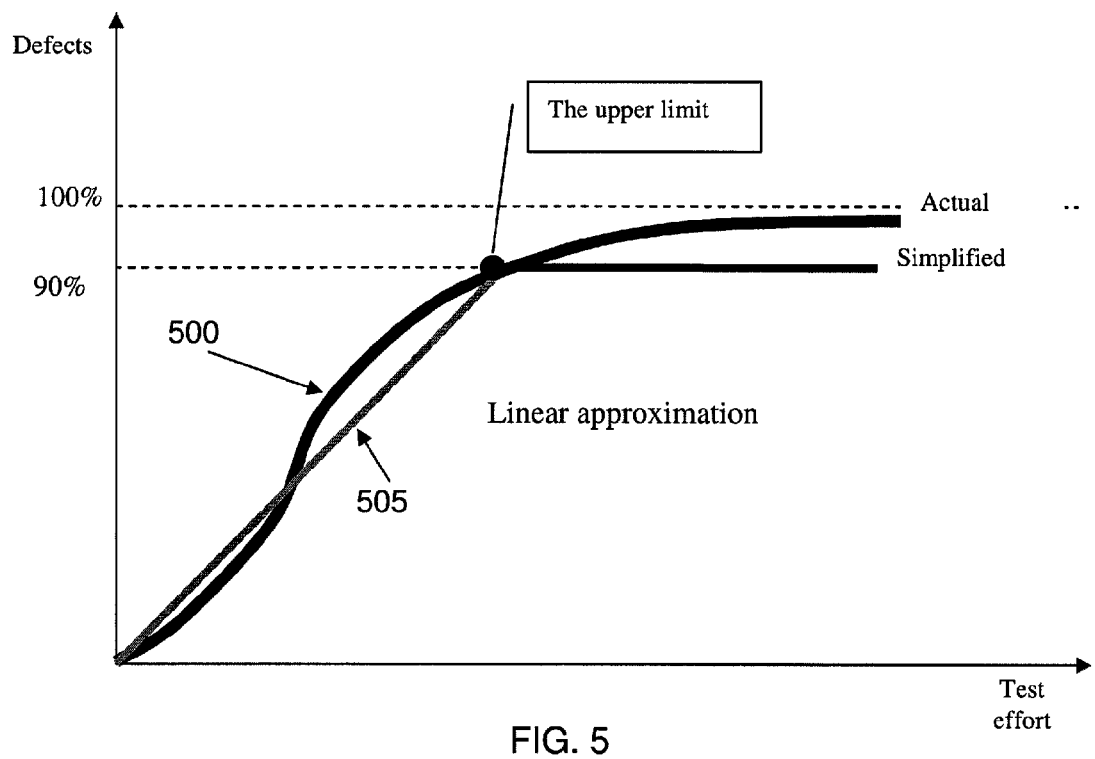
FIG. 5 illustrates the relationship between devoted effort and discovered defects in accordance with the present invention.

FIG. 5 illustrates the relationship between devoted effort and discovered defects. As shown in FIG. 5, the actual relationship between devoted effort and discovered defects may not be linear. For example, with more effort devoted, the discovered defects will be greater, but the discovered defects for each effort unit will be lower. This is illustrated by line 500. The relationship between devoted effort and the discovered defects for each trigger in each activity is shown by line 505.

As further shown in FIG. 5, there is an upper limit of the discovered defects for each trigger in each activity. For example, when the number of discovered defects is lower than the upper limit, there is a linear relationship between them; however, when the number of discovered defects is higher than the upper limit, there are no defects that will be discovered no matter how much effort is devoted. The relationship between discovered defects and the devoted effort specified by the listing piecewise function, is shown in the equation below.

$$f(x) = \begin{cases} DDE^*x (x <= a) \\ DisDefUpp^* totalDefs (x > a), \end{cases}$$

$$a = DisDefUpp^* totalDefs / DDE.$$

DisDefUpp is the upper limit of the percentage of the discovered defects, totalDefs is the total defects that can be discovered by the current trigger, and DDE is the defect discovery efficiency.

Figure 6:
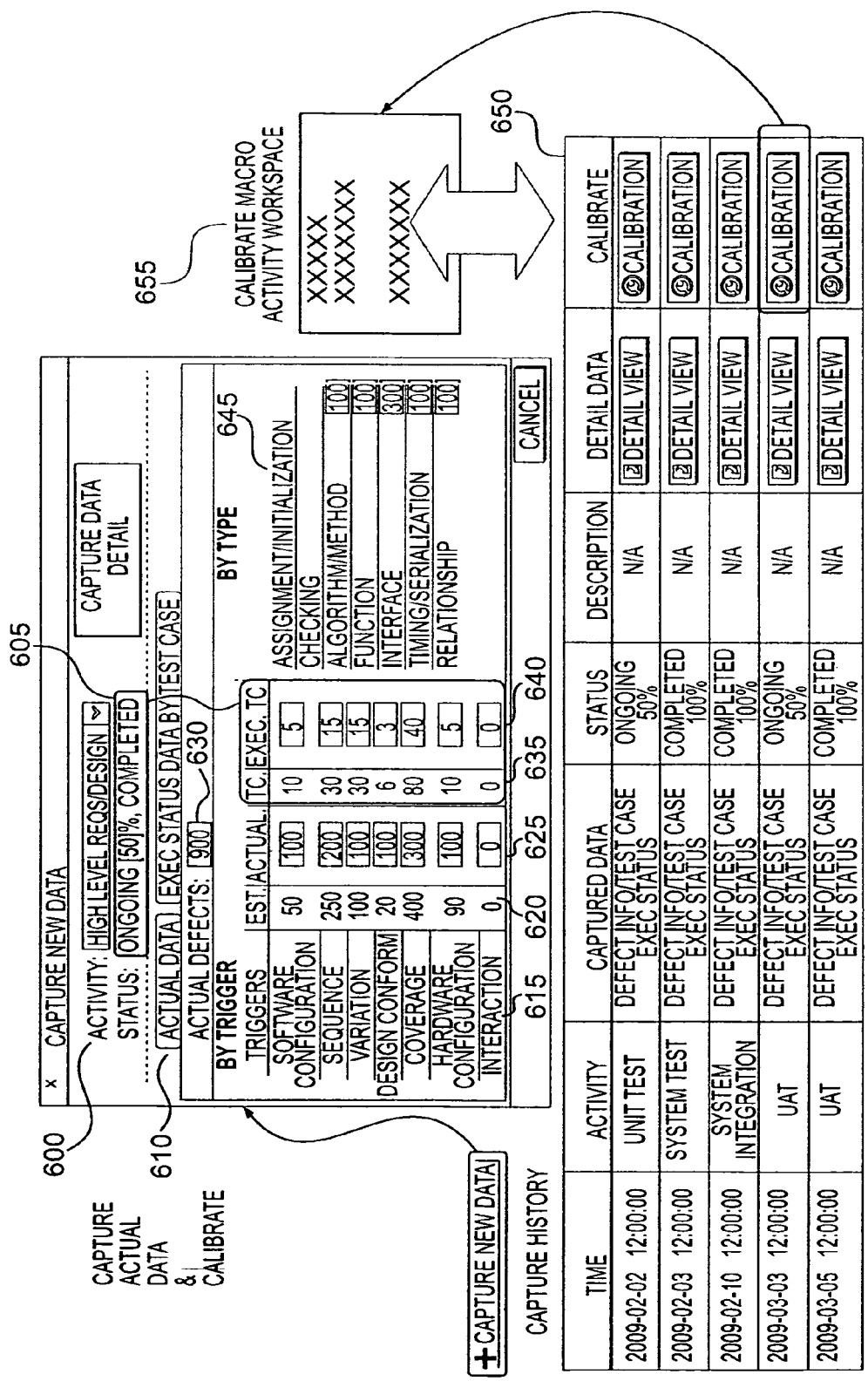
FIG. 6 represents a user interface and underlying functionality for performing calibration in accordance with the present invention.

FIG. 6 represents a user interface and underlying functionality of the calibration tool for performing calibration in accordance with the present invention. In embodiments, the calibration tool uses on the actual test data of a phase of a project, which can be manually input by users or imported from other tools such as any test or defect management tool known to those of skill in the art. The current implementation of the calibration tool is shown in FIG. 6; however, it should be understood by those of skill in the art that other implementations are also contemplated by the present invention.

More specifically, FIG. 6 shows an activity field 600 and a status field 605. The activity field 600 includes, for example, a current stage in a software integration project such as, for example, high level design review stage. The activity field 600 can be, for example, a drop down menu showing any activity in a software integration project. The status field 605, on the other hand, shows a percent completion of the activity. This will provide a status for the user, in order to determine the amount of data that has been captured.

The user interface of FIG. 6 also includes an actual data tab 610, which includes information concerning the actual data under test such as, for example, triggers 615, estimate of defects 620, actual defects found for each trigger 625, total defects found 630, test cases 635, test cases completed 640 and type 645. In the example shown, the triggers 615 may include, for example, software configuration, sequence, variation, design conformity, coverage, hardware interaction and interaction, amongst others. The estimation of defects 620 will show an estimate of the defects that are expected to be found for each of the triggers, and the actual defects will show the actual defects found for each respective trigger. In embodiments, the actual defects for each trigger will equal the total defects 630. In the case that the actual defects are much greater than the estimated defects, e.g., 10% or more, the developer (user) can review the defects to ensure that the results are accurate.

Additionally, the test cases 635 and executed test cases 640 will be used to populate the status field 605. For example, the total number of executed test cases completed with relation to the total test cases is shown as a percentage in the status field 605. The type field 645 will show the type of defect found and possible types of correction. For example, an initialization/assignment type (e.g., if/then statement) will signify a minor defect such as, for example, an initialization line has a typographical error. In embodiments, the types of defects can be listed in order of complexity; although, other formats are also contemplated by the present invention.

FIG. 6 also shows a history table 650. In embodiments, the history table 650 shows the captured results for the test. This may include, for example, the time of the test, the specific activity, the captured results, status (e.g., percent complete), description, detailed data tab and calibration tab. The detailed data tab will show the detailed data of the specific defect found during the test. The calibration tab, on the other hand, once selected, will calibrate the strategic development plan for the software integration project. The calibration will result in a new (updated) activity worksheet detailing future resource allocation, code alterations, etc. as shown at reference numeral 655. All of the information provided in the user interface of FIG. 6 can be stored in a database such as, for example, the storage 22B of FIG. 1.

In embodiments, the actual data can be listed as separated catalogues. The catalogues can be, for example, the actual data and the calibration results. For example, the first catalogue is directed to inputs and the second catalogue is directed to outputs. For the first catalogue, the calibration tool uses the actual data input by the user (or the actual data transferred from another tool) to replace the original input. For the second catalogue, the calibration tool uses a set of rules to adjust the inputs. These rules can be, for example, stored in the database of FIG. 1.

The output of the calibration tool may be referred to as symptom, cause, and treatment, as discussed above. For example, the "symptom" is a statement to specify a deviation. The "cause" defines which inputs do not match with the actual results data and the "treatment" defines how to adjust the value of the input to perform the calibration. In this way, the calibration tool can be used as a rule based reconciliation mechanism to dynamically calibrate the strategic development plan. An example rule is shown in TABLE 4, below.

TABLE 4

Figure 7:
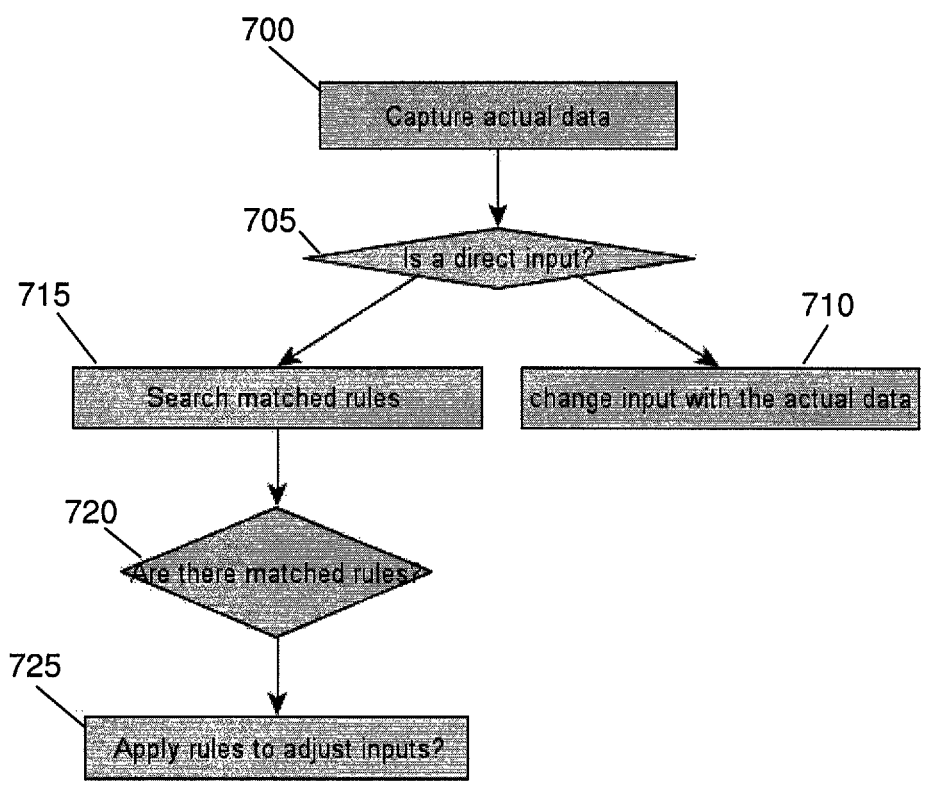
FIG. 7 shows a flow diagram implementing the optimization tool in accordance with the present invention.

Symptom:

Discovered defect volume is larger than expectation
Cause:

Defect density, size, DDE and devoted effort
Treatment:

Select an input to do adjustment according to the reliability of each input
Defect density adjustment
Size adjustment
DDE adjustment
Devoted Effort adjustment FIG. 7 shows a flow diagram implementing the functionality of the optimization tool in accordance with the present invention. In the example shown in FIG. 7, the system captures the actual data. If the actual data is a direct input of the estimation tool, the calibration tool directly changes the original input to the actual data. Otherwise, the optimization tool will search the predefined rules from the rule repository, e.g., database 22B. If there are matched rules, the optimization tool will apply the rule to adjust the related inputs. More specifically, at step 700, all of the actual data is captured, either manually or through a known expert tool. At step 705, the program control determines whether there is any estimated data. If there is a direct input, at step 710, the program control will change the estimated data with the direct input (actual data). At step 715, the program control will search for rules to match to the actual data. At step 720, the program control will determine whether there are any matched rules. If so, at step 720, the matched rules are applied to adjust the inputs.

Figure 8:
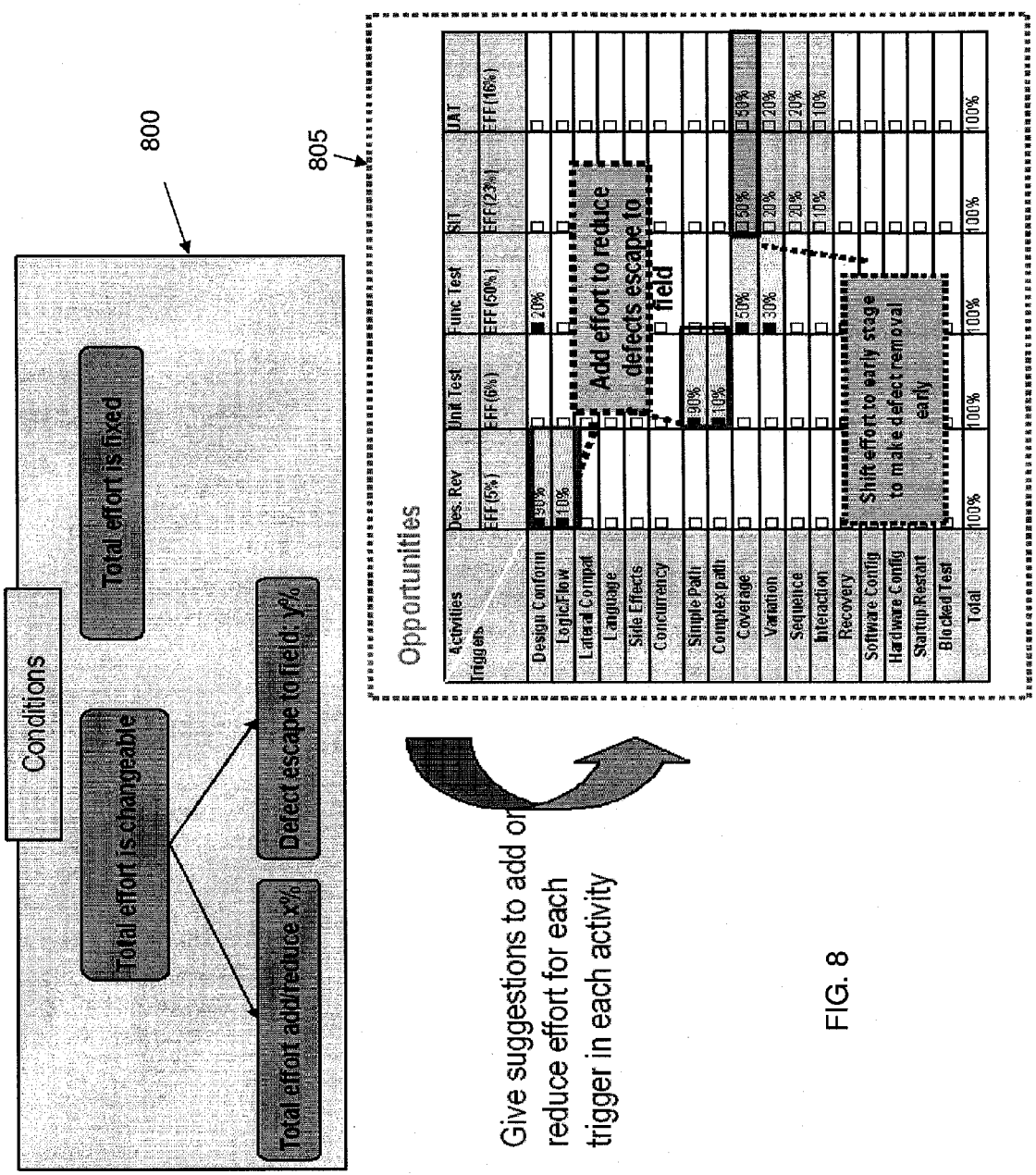
FIG. 8 represents a user interface and underlying functionality for performing optimization in accordance with the present invention.

FIG. 8 represents a user interface and underlying functionality for performing optimization in accordance with the present invention. For example, the optimization component (e.g., tool) generates a set of suggestions to achieve a predefined goal within a set of predefined constraints. The goal and constraints are represented by conditions as shown in box 800. The conditions can include, for example, the total changeable effort which can be represented by a total effort that has been added or reduced, as well as an acceptable quantity of defects to escape to field and an indication that the total effort is fixed. In embodiments, the defects to escape to the field may refer to the number of defects that escape detection throughout all defect removal activities the project performs prior to moving the product or system into production. The number of defects can be set by the developer.

In the interface shown in box 805, suggestions can be provided to add or reduce effort for each trigger in each activity. The box 800 can be formatted to include a plurality of activities and triggers, where an intersection (cell) of the activity and trigger may be represented by a percent change as calibrated by the calibration tool. The cells can be manually adjusted in order to meet certain goals. For example, the SIT/Coverage intersection cell can be adjusted from 50% to 40%. By making this change, any of the other triggers associated with the SIT activity can be readjusted so that the total percentage remains 100%. In this way, it is possible to shift efforts to an early stage of the integration project in order to remove defects at an earlier point in the project life cycle. For example, if a change in one trigger is made, then one or more adjustments in other applicable triggers for that activity are adjusted such that the total of all triggers in that activity equals 100%. If the user makes a change, though, the system and method suggests distributions based on maturity or project profile information, or due to some calculation performed, such as any reconciliation or calibration invoked by the user, for example.

In one example, in the situations where total effort (total Person Days (PD) for instance) can be adjusted, the optimization tool makes recommendations on adjusting effort for each activity in order to meet the user (or expert system) defined target for the percentage of defects that will escape to production. On the other hand, if the total effort is fixed, then the optimization component (tool) tries to find the most efficient allocation of effort among the activities so that the total discovered defects prior to moving to production is maximized, leading to the lowest possible defect escape rate in production. Thus, the optimization tool adopted in both cases is dynamically programmed, which is an appropriate choice to shift or adjust efforts for individual trigger and activity. In mathematics and computer science, dynamic programming is a method of solving problems that exhibit the properties of overlapping sub problems and optimal substructure. That is, dynamic programming is an optimization technique that transforms a maximization (or minimization) problem involving "n" decision variables into n problems having only one decision variable each.

ILLUSTRATIVE EXAMPLES

The following are illustrative examples of implementations of the present invention using, for example, predefined rules stored in a database (e.g., storage system 22B of FIG. 1). The below examples are not to be considered limiting features of the present invention, and are merely provided to show further implementations of embodiments of the present invention. The below examples further show many different implementations of the present invention, including rules that can be stored in the storage system 22B of FIG. 1, representing different symptoms, causes and treatments. In the examples below all the opportunities are applied to unlocked activities (e.g., activities that are marked as being able to be adjusted).

Example 1

If given the effort required, the problem is solved as follows:

1. Remove The Wasteful Effort. In this solution, although the effort is devoted, there are no discovered defects according to the simplified relationship between effort and discovered defects.

2. Add/Reduce Effort To Make The Total Effort Reach The Expected Value. In this solution, a dynamic programming algorithm is applied to add/reduce the effort to/from the cells. Each cell represents a trigger in an activity.

3. Shift Effort. In this solution, the effort will be shifted from a cell (trigger in one activity) with a low DDE to a cell with high DDE. The shifting can be based on a dynamical programming algorithm.

Remove Wasted Effort

For each cell, if the devoted effort is more than the effort that is required to discover the residual defects (totalDefs*DisDefUp<effort*DDE), there is wasted effort. And the wasted effort is equal to the required effort subtracted from the devoted effort (effort−(totalDefs*DisDefUp)/DDE).

Add Effort

The problem is specified as follows:

Stages: Order the cell with DDE from high to low. Each stage is related to one cell.

Status: The residual defects of each trigger.

Decision Making: At each stage, the discovered defects for each effort unit should reach a maximum. If a set of cells have the same DDE, the solution applies a rule which adds the effort based on the residual defect number. If there are more residual defects related with the trigger in this cell, more effort will be added to this cell.

Optimized goal: the number of total discovered defects reaches the maximum.

Reduce Effort

The problem is specified as follows:

Stages: Order the cell with DDE from low to high. Each stage is related one cell.

Status: The residue defects of each trigger and the discovered defects for each cell.

Decision Making: At each stage, the decreased discovered defects for reduced effort should reach the minimum. If a set of cells have the same DDE, the solution applies a rule which reduces the effort based on the discovered defect number. If there are more discovered defects related of this cell, effort will be reduced from this cell.

Optimized goal: The number of reduced discovered defects reaches the minimum.

Shift Effort

The problem is specified as follows:

Stages: Order the cell with DDE from high to low. Each stage is related to one cell.

Status: The residual defects of each trigger and the discovered defects for each cell.

Decision Making: At each stage, if the effort is removed from the cells with low DDE to the current cell with high DDE is useful and not wasted, then the effort is removed.

Optimized Goal: The number of discovered defects reaches the maximum.

Example 2

If given an expected quality goal (such as y % defects escape to field), the problem is solved as follows:
1. Remove The Wasteful Effort. Although the effort is devoted, there are no discovered defects according to our simplified relationship between effort and discovered defects.
2. Add/Reduce Discovered Defects To Make The Residual Defect Rate In Production Reach The Expected Value. In this solution, a dynamic programming algorithm is applied to add/reduce the discovered defects to/from the cells.
3. Shift Defect Removal. In this solution, the discovered defects will be shifted from the cell (cell=one Trigger in one Activity) with low DDE to the cell with high DDE. The shifting algorithm is also based on a dynamic programming algorithm.

Remove Wasted Effort

For each cell, if the devoted effort is more than the effort that is required to discover the residue defects (totalDefs*DisDefUp<effort*DDE), there is wasted effort. And the wasted effort is equal to subtract the required effort from the devoted effort (effort−(totalDefs*DisDefUp)/DDE).

Add Discovered Defects

The problem is specified as follows:

Stages: Order the cell with DDE from high to low. Each stage is related one cell.

Status: the residue defects of each trigger

Decision Making: At each stage, the devoted effort for each one discovered defect should reach the minimum. If a set of cells have same DDE, a rule is applied to add the discovered defects based on the residual defect number. If there are more residual defects related to the trigger in this cell, more discovered defects will be added to this cell.

Optimized Goal: the number of total devoted effort reaches the minimum.

Reduce Discovered Defects

The problem is specified as follows:

Stages: Order the cell with DDE from low to high. Each stage is related one cell.

Status: the residual defects of each trigger and the discovered defects for each cell.

Decision Making: At each stage, the decreased discovered defects for reduced effort should reach the minimum. If a set of cells have same DDE, a rule is applied to reduce the discovered defects based on the current discovered defect number. If more discovered defects are related to this cell, there are more discovered defects that will be reduced from this cell.

Optimized Goal: the value of reduced effort reaches the minimum.

Shift Discovered Defects

The problem is specified as follows:

Stages: Order the cell with DDE from high to low. Each stage is related one cell.

Status: the residue defects of each trigger and the discovered defects for each cell.

Decision Making: At each stage, if the discovered defects are removed from the cells with low DDE to the current cell with high DDE is possible, then these discovered defects.

Optimized Goal: the value of devoted effort reaches the maximum.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method implemented in a computer infrastructure having computer executable code tangibly embodied on a computer readable storage memory having programming instructions operable to:
   compare actual data associated with each activity of a phase of a project to expected results used to develop a strategic development plan for the project; and
   calibrate efforts in the strategic development plan for future activities of the project based on the actual data,
   wherein the calibrating includes:
      determining a relationship between discovered defects and devoted effort, wherein the relationship is linear when a number of the discovered defects is lower than an upper limit of the discovered defects for each trigger in the each activity, and the relationship is nonlinear when the number of the discovered defects is higher than the upper limit of the discovered defects for each trigger in the each activity;
      utilizing the determined relationship to calibrate the efforts in the strategic development plan for the future activities by maintaining the devoted effort below the upper limit of the discovered defects in order to maximize a defect discovery efficiency; and
      adjusting the efforts by a determined percentage for future activities associated with the project.

2. The method of claim 1, wherein the calibrating is an ongoing, dynamic calibration of the strategic development plan which is performed prior to completion of an entire software integration project.

3. The method of claim 1, wherein the actual data is test data obtained from a test of a completed phase of the project.

4. The method of claim 3, wherein the actual data is obtained from at least one of a high level development phase, detail review phase, code inspection phase, unit test phase, system test phase, SIT (System Integration Test) phase, performance testing phase a UA (User Acceptance) phase.

5. The method of claim 1, wherein the expected results is obtained by performing an initial estimation of the project based on information provided by a user or expert system, wherein the information includes at least one of complexity of the project, personnel decisions, resource allocations and maturity of an organization.

6. The method of claim 1, wherein the expected results are estimates of a test effect according to a plan, test organization and the system under testing.

7. The method of claim 1, wherein:
the calibrating is performed when the actual data does not match the expected results, and
the calibrating updates the strategic development plan, in real time, to adjust an overall strategy to match with the actual data.

8. The method of claim 1, wherein the calibrating is based on a rule set stored in a database.

9. The method of claim 1, further comprising optimizing the strategic development plan based on the calibrating when a defect pattern develops.

10. The method of claim 1, further comprising simulating an estimate of future efforts associated with the strategic development plan after the calibrating is performed such that when the estimate does not meet expectations, the calibrating is performed again.

11. The method of claim 1, wherein a service provider at least one of creates, maintains, deploys and supports the computer infrastructure.

12. The method of claim 1, further comprising a user interface which shows current activity, expected defects, found defects and type of defects.

13. A method implemented in a computer infrastructure having computer executable code tangibly embodied on a computer readable storage memory having programming instructions operable to:
compare actual data associated with a phase of a project to expected results used to develop a strategic development plan for the project;
calibrate efforts in the strategic development plan for future activities of the project based on the actual data, wherein the calibrating includes adjusting the efforts by a determined percentage for future activities associated with the project; and
determine a relationship between discovered defects and devoted effort to discover the defects by:

$$f(x) = \begin{cases} DDE^* x (x <= a) \\ DisDefUpp^* totalDefs(x > a), \end{cases}$$

$$a = DisDefUpp^* totalDefs / DDE,$$

wherein DisDefUpp is an upper limit of a percentage of the discovered defects, totalDefs is total defects that can be discovered by a current trigger, and DDE is defect discovery efficiency.

14. A system comprising:
a calibration tool implemented as a hardware device that is operable to:
calibrate a strategic development plan originally based on expected results obtained from a user or expert system; wherein the calibration tool calibrates efforts noted in the strategic development plan for future activities in a project using actual data obtained from each activity of a current phase of the project;
determine a relationship between discovered defects and devoted effort, wherein the relationship is linear when a number of the discovered defects is lower than an upper limit of the discovered defects for each trigger in the each activity, and the relationship is nonlinear when the number of the discovered defects is higher than the upper limit of the discovered defects for each trigger in the each activity;
utilize the determined relationship to calibrate the efforts in the strategic development plan for the future activities by maintaining the devoted effort below the upper limit of the discovered defects in order to maximize a defect discovery efficiency; and
adjust the actual data to adjust future phases of the project based on the actual data; and
an optimization tool that is operable to adjust the strategic development plan to achieve a desired goal based on the calibration and to adjust an original strategic development plan to achieve the desired goal.

15. The system of claim 14, further comprising an estimation tool for developing the strategic development plan based on the expected results input from the user or the expert system.

16. The system of claim 15, wherein the estimation tool develops a simulation of the strategic development plan based on the results of the calibration tool prior to updating the strategic development plan.

17. The system of claim 14, wherein the actual data is obtained from any of life cycle phases of a software development project including at least one of a high level development phase, a detail review phase, a code inspection phase, a unit test phase, a system test phase, SIT (System Integration Test) phase, a performance testing phase and a UA (User Acceptance) phase.

18. The system of claim 14, wherein the calibration tool provides a percentage change to an estimated effort needed for a particular phase in the project to show the user how to adjust resources for future activities in the project.

19. A computer program product comprising a computer usable storage memory having readable program code embodied in the storage medium, the computer program product includes at least one component operable to:
receive expected results to develop a strategic development plan for a software integration project;
compare actual test data associated with a phase of the software integration project to the expected results;
dynamically calibrate efforts for future activities based on the actual data when the actual data does not match the expected test results;
leverage the actual data as a project is progressing, and translate the actual data into adjustments to an original strategic development plan, in real time; and
determine a relationship between discovered defects and devoted effort to discover the defects by:

$$f(x) = \begin{cases} DDE^* x (x <= a) \\ DisDefUpp^* totalDefs(x > a), \end{cases}$$

$$a = DisDefUpp^* totalDefs / DDE,$$

wherein DisDefUpp is an upper limit of a percentage of the discovered defects, totalDefs is total defects that can be discovered by a current trigger, and DDE is defect discovery efficiency.

20. The computer program product of claim 19, wherein the actual test data is obtained from any of life cycle phases of a software development project including at least one of a high level development phase, a detail review phase, a code inspection phase, a unit test phase, a system test phase, SIT (System Integration Test) phase, a performance testing phase and a UA (User Acceptance) phase.

21. The computer program product of claim 19, wherein the calibrating is an ongoing, dynamic process performed prior to completion of an entire software integration project.

22. The computer program product of claim 19, further comprising optimizing the strategic development plan based on the calibrating.

23. A computer system for providing a projection analysis based on a maturity level for an organization, the system comprising:

a CPU, a computer readable memory and a computer readable storage media;
 first program instructions to receive expected results to develop a strategic development plan for a software integration project;
 second program instructions to compare actual test data associated with each activity of a phase of the software integration project to the expected results;
 third program instructions to dynamically calibrate efforts for future activities based on the actual data when the actual data does not match the expected test results; and
 fourth program instructions to leverage the actual data as a project is progressing, and translate the actual data into adjustments to an original strategic development plan, in real time,
 wherein the dynamically calibrate the efforts includes:
  determining a relationship between discovered defects and devoted effort, wherein the relationship is linear when a number of the discovered defects is lower than an upper limit of the discovered defects for each trigger in the each activity, and the relationship is nonlinear when the number of the discovered defects is higher than the upper limit of the discovered defects for each trigger in the each activity; and
  utilizing the determined relationship to calibrate the efforts in the strategic development plan for the future activities by maintaining the devoted effort below the upper limit of the discovered defects in order to maximize a defect discovery efficiency; and
 the first, second, third, and fourth program instructions are stored on the computer readable storage media for execution by the CPU via the computer readable memory.

\* \* \* \* \*